Jan. 2, 1923.    1,441,015.
C. P. MARYE.
THREAD MACHINE CUTTER.
FILED DEC. 1, 1919.
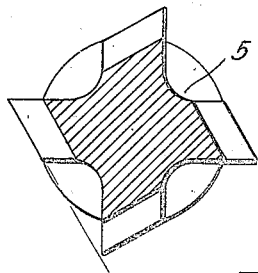
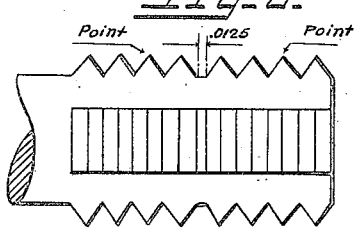
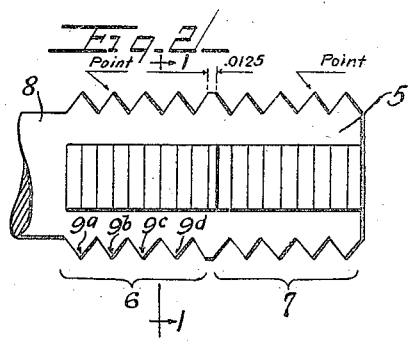
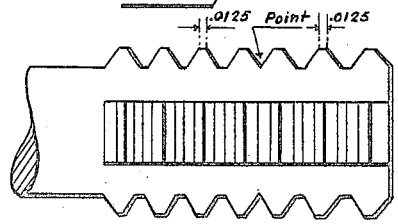
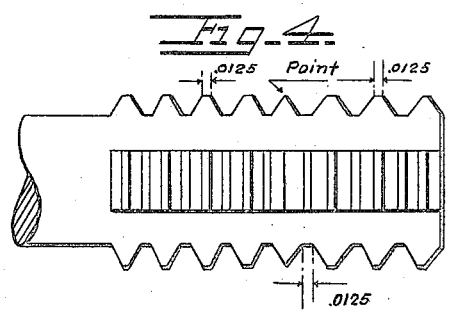
Inventor:
Clifford P. Marye Patented Jan. 2, 1923.

1,441,015

UNITED STATES PATENT OFFICE.

CLIFFORD P. MARYE, OF CHICAGO, ILLINOIS, ASSIGNOR TO MARYE SAFETY NUT CORPORATION, A CORPORATION OF ILLINOIS.

THREAD-MACHINE CUTTER.

Application filed December 1, 1919. Serial No. 341,760.

*To all whom it may concern:*

Be it known that I, CLIFFORD P. MARYE, a citizen of the United States, residing at Chicago, in the county of Cook and State of Illinois, have invented certain new and useful Improvements in Thread-Machine Cutters, of which the following is a specification.

The invention relates to improvements in thread milling cutters.

One of the objects of the invention is to provide a milling cutter especially designed for milling threads in bolt nuts or on bolts in or on which there are to be produced a plurality of sets or groups of threads having substantially the same spiral lead but which may be anomalous in other respects.

Another object is to provide a thread milling cutter adapted for milling threads, in nuts or on bolts, of character such as disclosed in my Patent No. 1,210,507 granted to me January 2nd, 1917, wherein two sets of threads of the same spiral inclination, or lead, are separated, or offset, to an extent to prevent uniform thread alignment at the point of juncture of the two groups.

Another object is to provide a milling cutter for milling threads in nuts. which may be supported at both of its ends.

Another object is to provide a milling cutter having a plurality of circumferentially extending cutters, each having a plurality of teeth located in the same respective transverse plane for milling threads in nuts or on bolts, depending upon the relative axial movement of the milling tool and the work, to generate the lead, or spiral inclinations of the threads.

Another object of the invention is to provide a milling cutter adapted to mill two separated groups of threads in a nut at the same time.

Other, further and more specific objects of my invention will become readily apparent, to persons skilled in the art, from a consideration of the following description when taken in conjunction with the drawings, wherein :—

Fig. 1 is a transverse sectional view of the cutter shown on line 1—1 of Fig. 2.

Fig. 2 is a side elevation of the tool showing the two groups of normal threads separated by an abnormal thread.

Fig. 3 is a similar view of the tool having the abnormal separation at the valley between adjacent threads.

Fig. 4 is a similar view of the tool showing a subnormal thread separating the two groups of normal threads.

Fig. 5 is a similar view of the tool having the subnormal separation at the valley between adjacent threads.

In all the views the same reference characters are employed to indicate similar parts.

As shown in the drawings, 5 is the body part of the tool, provided with two groups of cutters 6 and 7, respectively each cutter having a plurality of teeth. 8 is a shank by which the tool may be held for rotation and 8′ is an extended end that may or may not be used. When the bearing end 8′ is used, the tool is supported at both ends and is more stable and rigid, although it may be formed without this part, as shown in Fig. 3.

In the drawing the body of the tool is shown to have two sets of uniformly separated milling cutters. Each cutter is divided circumferentially into a plurality of cutting teeth, the teeth of each cutter being in the same transverse plane. The cutters of a group are separated a uniform distance apart along the axis of the tool, the groups of cutters are, however, abnormally separated, that is, the groups may be separated to a greater or less extent than the separation between adjacent cutters, but never to the same extent. The teeth do not extend spirally in an axial direction as in taps but do extend around the body in the same transverse diametric plane. There are shown two groups, 6 and 7, of the cutters. The cutters of each group are separated a uniform distance apart as the threads of an ordinary nut, and each cutter 9 and 10 is shown to have a plurality of teeth $9^a$ and $9^b$, $9^c$ and $9^d$, respectively.

Between the adjacent sections of teeth is a clearance groove 11 which extends in an axial direction the full distance of the tool occupied by the cutters, as in a tap. The groups 6 and 7 of the cutters, in Fig. 2, are closer together at the point 12 than the pitch distance between the respective cutters of the groups so that when the tool is rotated in a nut and moved axially to generate the threads, the two sets of threads will be out of spiral alignment because the respective groups of cutters are closer together than the pitch or distance between the adjacent threads of the respective groups of the cutters, while in Fig. 3, as at 13, the cutters are further apart than the pitch distance between the teeth of the respective groups so that when the threads are made in the nuts by the milling tool shown in Fig. 3, the two groups of threads are axially separated a distance greater than the pitch distance between the adjacent teeth of either group, and, therefore, the thread of the two groups is out of spiral alignment at the point of the closest approximation. The word "pitch" is used as defining the distance between the apex of adjoining teeth or cutters, and the word "teeth" is used to designate the cutting parts of each cutter, while "threads" refer to the continuous spiral cut in an object or nut by use of the tool.

While I have shown the two groups of threads 6 and 7 to be of the same pitch it will be manifest, from the foregoing description that they may be of a different pitch but the threads which they generate will be of the same spiral inclination as the tool is bodily advanced axially for the purpose of generating the threads during its operation.

The tool, shown in the drawing, has the general appearance of a tap, by which threads are usually "tapped" in nuts with the distinguishing difference that in the milling tool herein disclosed, the section of the same tooth are in the same diametric or transverse plane while in a tap they are spirally inclined in circumferential direction and in operation the tap cuts on all sides of the nut at the same time, while the milling tool herein is rotated at a high speed and cuts the nut only on one side of its diameter as the nut is rotated and the nut and tool are relatively moved in axial direction at the time of its rotation for the purpose of generating the spiral inclination of the threads.

While I have herein shown a single embodiment of my invention, for the purpose of clear disclosure, it will be manifest to persons skilled in the art, that changes may be made in the configuration and general shape of the parts within the scope of the appended claims.

Having described my invention, what I claim is:—

1. A thread milling tool having two like groups of thread milling cutters, the normal cutters of the groups being uniformly spaced apart and the distance between the uniform groups being different from the distance of separation between the normal cutters.

2. A thread milling tool having a plurality of separated groups of thread milling cutters, each cutter divided circumferentially into teeth that are located in substantially the same transverse plane, the separation between the groups being different from the separation between the cutters.

3. A thread milling tool having a plurality of groups of thread milling cutters, each cutter of each group divided circumferentially into a plurality of teeth in the same transverse plane and said groups separated from each other to an extent differing from the distance of separation of adjacent teeth, the separation between adjacent cutters being the same in each group.

4. A thread milling tool having a plurality of thread milling cutters divided axially into separated groups, each cutter divided circumferentially into a plurality of teeth, the distance of separation between the groups adapted to produce abnormal friction on opposite sides of the thread of a bolt at the point of separation.

5. A thread milling tool having a plurality of teeth, each tooth divided into sections that extend circumferentially in the same diametric plane, said teeth divided into a plurality of groups of like pitch, said cutter adapted to cut a thread in a nut in which the threads will be divided into groups, the lead of the threads being out of alignment between the groups.

6. A thread milling tool having a plurality of axially-arranged groups of thread cutting teeth, the axial distance between the teeth forming the groups differing from the distance between groups.

In testimony whereof I hereunto subscribed my name.

CLIFFORD P. MARYE.